United States Patent [19]

Suzuki et al.

[11] 4,322,144
[45] Mar. 30, 1982

[54] APERTURE STOP-DOWN CONFIRMATION DEVICE FOR CAMERA

[75] Inventors: Ryoichi Suzuki, Kawasaki; Takashi Uchiyama, Yokohama, both of Japan

[73] Assignee: Canon Kabushiki Kaisha, Tokyo, Japan

[21] Appl. No.: 164,521

[22] Filed: Jul. 2, 1980

[30] Foreign Application Priority Data

Jul. 5, 1979 [JP] Japan ................................. 54-85175

[51] Int. Cl.³ .......................... G03B 7/095; G03B 9/02
[52] U.S. Cl. ...................................... 354/43; 354/271; 354/272
[58] Field of Search ................... 354/43, 44, 47, 23 D, 354/60 A, 266, 271, 272, 232, 227, 36, 38

[56] References Cited

U.S. PATENT DOCUMENTS 3,950,767  4/1976  Matsui ............................... 354/43 X
4,054,890  10/1977  Shimomura .......................... 354/227

Primary Examiner—L. T. Hix
Assistant Examiner—William B. Perkey
Attorney, Agent, or Firm—Toren, McGeady & Stanger

[57] ABSTRACT

The present invention relates to an aperture stop-down confirmation device for a camera. So far, in order to carry out the aperture stop-down operation for confirming the depth of focus before photographing in the case of a camera having a mechanical diaphragm device, it is necessary to drive the diaphragm member against the strength of the charge spring of the diaphragm device so that considerable strength is needed for carrying out the diaphragm closing, which is inconvenient. In accordance with the present invention, a diaphragm device whose aperture is controlled by means of an electrical signal such as a diaphragm device making use of a property of matter is so designed that the light admitting part and the light shading part are constituted by varying the light transmittance. The aperture is constituted with the light admitting part or an electromagnetic diaphragm device is used while an aperture stop-down confirmation switch is provided in such a manner that an electrical signal is applied to the diaphragm device by means of the switch so as to carry out the diaphragm closing in order to eliminate the above-mentioned shortcomings.

14 Claims, 10 Drawing Figures

FIG.1 (1)
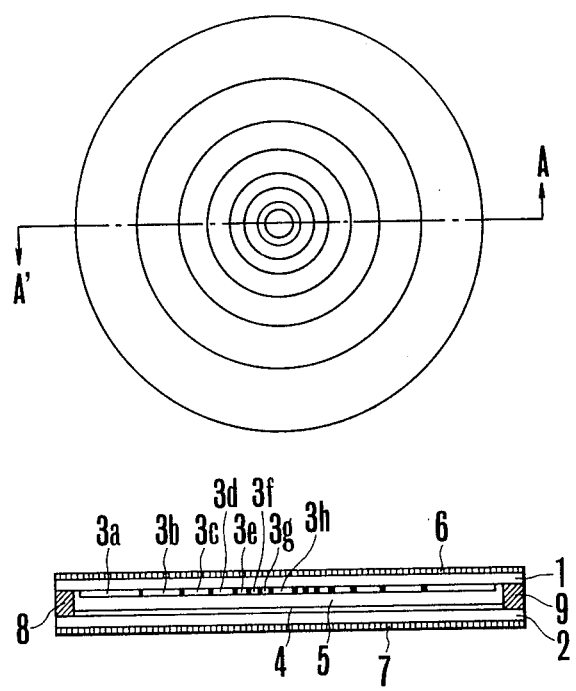

F I G. 1 (2)
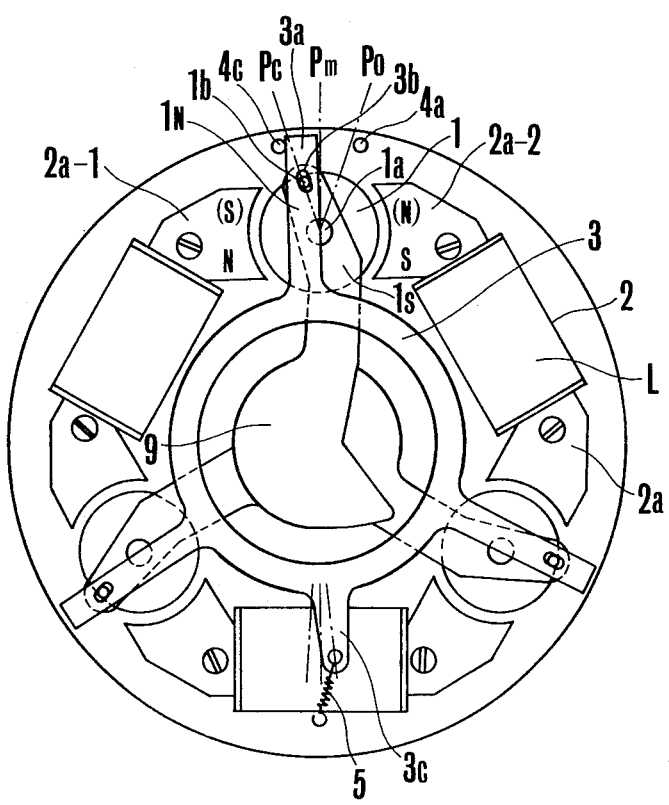

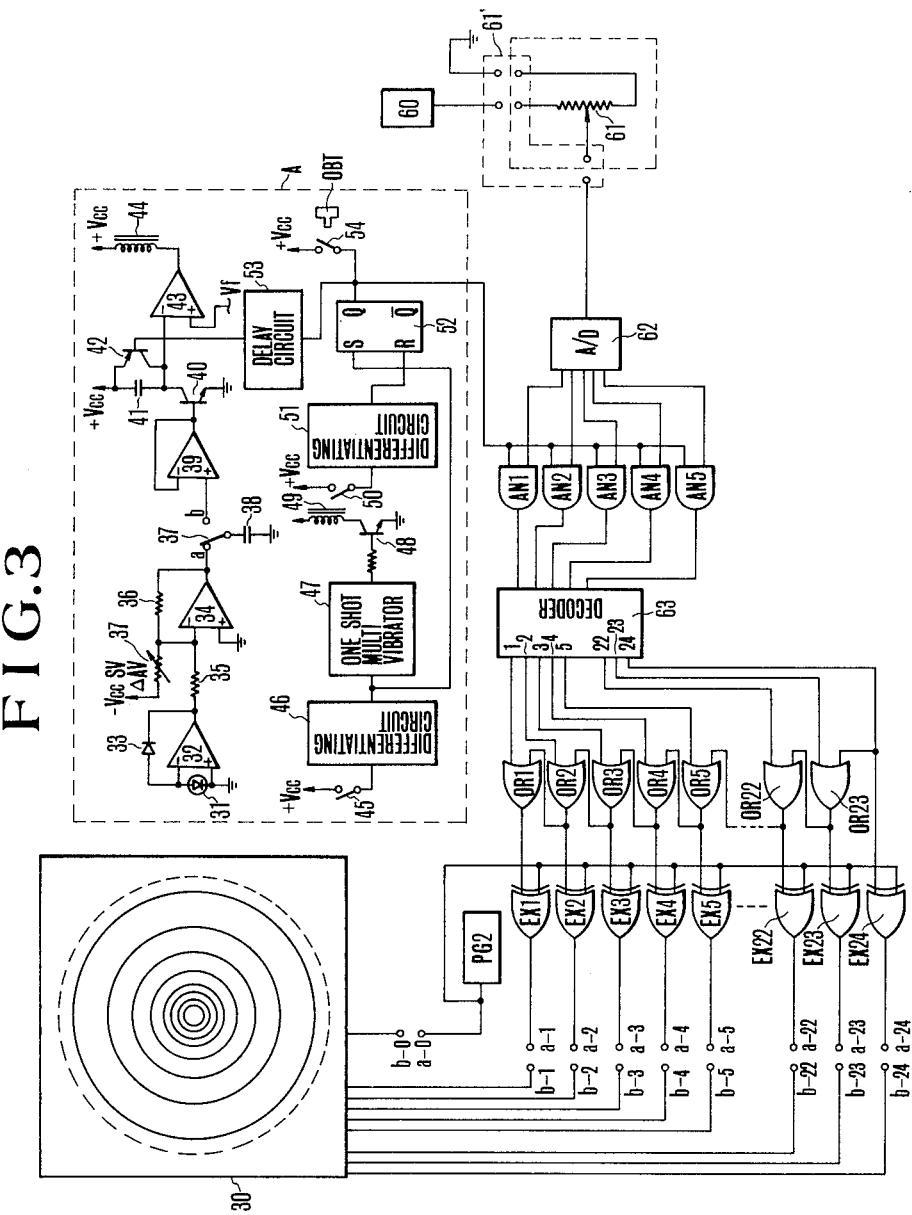
F I G. 3

F I G. 4 (1)
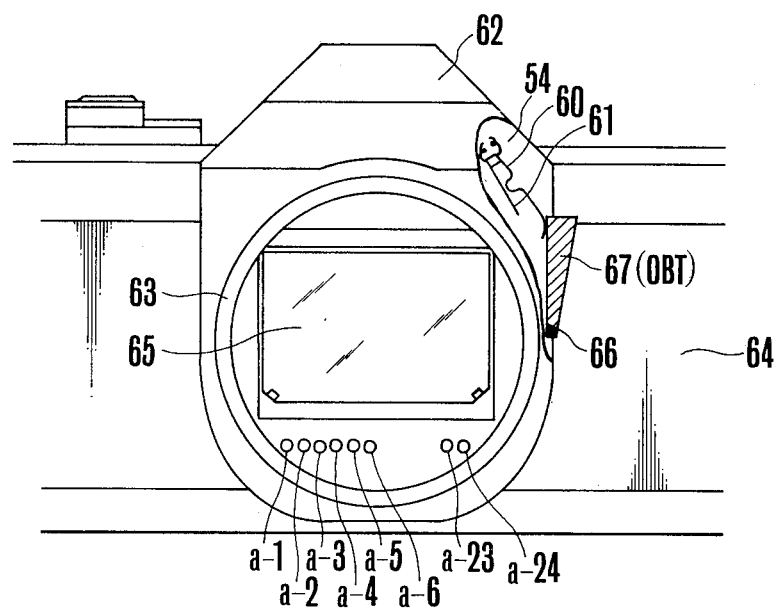
F I G. 4 (2)
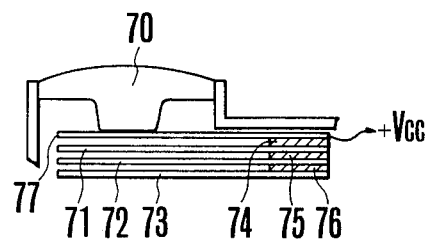

APERTURE STOP-DOWN CONFIRMATION DEVICE FOR CAMERA

BACKGROUND OF THE INVENTION

1. Field of the Invention

The present invention relates to a so called diaphragm making use of a property of matter so designed that an electrical or a magnetic optical element whose light transmittance pvaries under the electrical of the magnetic field is used for the diaphragm device for a single lens reflex camera with TTL light measuring system, particularly to a device for confirming the depth of focus by means of the diaphragm making use of a property of matter.

Further, the present invention relates to a device for confirming the depth of focus by means of an electromagnetic diaphragm driven with the electromagnetic force.

2. Description of the Prior Art

Until now the strength of a spring is used as the driving force for the diaphragm device for a camera, and therefore a mechanism for charging it is needed. Further, in the case where the diaphragm device is provided on the interchangeable lens, a complicated connecting mechanism of the camera body with the diaphragm device of the interchangeable lens is needed, which results in increasing cost and complexity of the camera mechanism.

Further, in the case where the conventional diaphragm device is closed for confirming the depth of focus, it is necessary to exert power against the strength of the spring, which means that considerable power is needed.

In the case of conventional automatic exposure single lens reflex cameras with priority on shutter time, the diaphragm device in the interchangeable lens is driven by releasing the charged strength at the side of the camera body, so that when the diaphragm closing confirmation operation is carried out in advance, the charged strength is released, which means that recharging becomes necessary for shutter release.

Further, when, in the case of the conventional diaphragm device, the diaphragm closing operation is once carried out, the diaphragm is closed down to the aperture value corresponding to the object brightness information before the diaphragm has been closed and the value is maintained after that. Thus, even when the object brightness varies for some reason, the aperture value is not varied, which cannot be said to be the correct aperture value.

Recently, various types of diaphragm making use of a property of matter in which the electromagnetic optical element whose light transmittance varies under an electric (or magnetic) field have been proposed for use in a camera. For use as the above mentioned electromagnetic optical elements, the Kerr cell, the transparent ferroelectric ceramic (PLZT) and the liquid crystal whose optical characteristics vary in the presence of the electrical field, the Faraday element whose optical characteristics vary in the presence of a magnetic field, the electrochromy element making use of the electrodeposition or the element making use of the electrophoresis are known. These diaphragms which make use of a property of matter have many features that the conventional mechanical diaphragm does not. Firstly, no mechanical connecting mechanism is needed so that they are compact and light. This contributes greatly to freedom in camera design. Further, there takes place no shock at the time of the diaphragm closing and the noise accompanied therewith so that it is convenient for the photographer. Further, because the diaphragm making use of a property of matter is driven by means of an electrical circuit, such diaphragm can be well adapted to the recent electronic camera and can be a large step in the realization of a totally electronic camera in the future.

Various electromagnetic diaphragms driven electromagnetically have also been proposed.

The present invention is intended to offer an aperture stop-down confirmation device for such diaphragm making use of a property of matter or electromagnetic diaphragm.

SUMMARY OF THE INVENTION

An object of the present invention is to offer an electromagnetic diaphragm or a diaphragm making use of matter capable of carrying out the aperture stop-down confirmation operation simply by closing of the electric switch.

A second object of the present invention is to offer an aperture stop-down confirmation device for the automatic exposure single reflex camera with priority on shutter time in the automatic exposure mode.

A third object of the present invention is to offer an aperture stop-down confirmation device whose stop-down amount varies together with the variation of the object brightness and so on at the time of the aperture stop-down confirmation for the automatic exposure single lens reflex camera with priority on shutter time in the automatic exposure mode.

Another object of the present invention is to offer an aperture stop-down confirmation device capable of carrying out the aperture stop-down confirmation operation in accordance with the object brightness and so on for the automatic exposure camera with priority on shutter time in AE mode, which has, thus far been difficult for the conventional spring driven diaphragm.

Further objects of the present invention will be obvious to an individual skilled in the art by the explanations to be made below in accordance with the drawings of the different embodiments.

BRIEF DESCRIPTION OF THE DRAWINGS

FIG. 1(1) shows an example of the diaphragm making use of a property of matter to be used for the aperture stop-down confirmation device in accordance with the present invention, and its section along A'—A.

FIG. 1(2) shows an example of the electromagnetic diaphragm device to be used for the aperture stop-down confirmation device in accordance with the present invention in plane view.

FIG. 2 shows an example of the single lens reflex camera in which the diaphragm making use of a property of matter or the electromagnetic diaphragm is built in.

FIG. 3 shows an example of the electrical circuit of the camera provided with the aperture stop-down confirmation device in accordance with the present invention.

FIGS. 4(1) and (2) show an example of the camera provided with the aperture stop-down confirmation device in accordance with the present invention.

DESCRIPTION OF THE PREFERRED EMBODIMENTS

Figure 2:
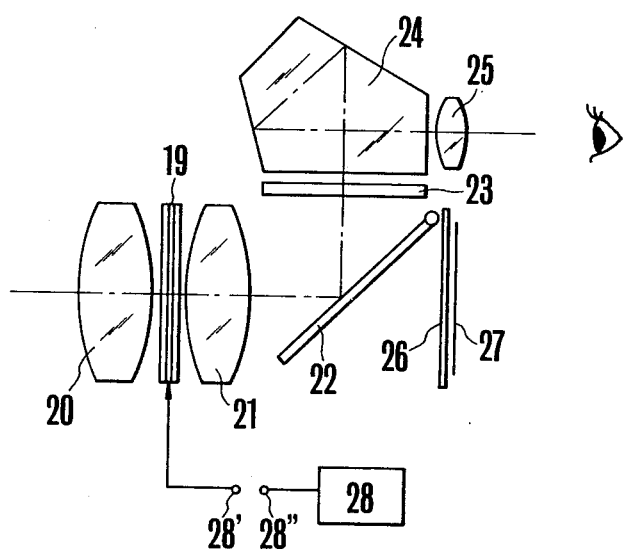

Below, the present invention will be explained in detail in accordance with the accompanying drawings of the different embodiments.

FIG. 1(1) shows the first embodiment of a diaphragm making use of a property of matter to be applied in the context of the present invention. In this embodiment, a diaphragm making use of liquid crystal is contemplated.

In the drawing, 1 and 2 are the transparent glass plates, 3a–3h are the circular or doughnut shaped transparent split electrodes formed on the one transparent glass plate 1, and 4 is the common transparent electrode formed on the other transparent glass plate 2. 5 is the liquid crystal in nematic state put between both of the transparent base plates, being orientated in a twist mode. 8 and 9 are the separator for serving to keep the space distance between the transparent base plates 1 and 2 and preventing the leakage of the nematic liquid crystal. 6 and 7 are the polarization plates arranged outside of the above transparent base plates, whereby the direction of the polarization of the plate 6 and that of 7 are crossed at 90° with respect to each other.

Because the nematic liquid crystal orientated in twist mode has the rotatory polarization efficiency for rotating the polarization direction of the incident polarized light by 90° when no voltage is applied, the polarization direction of the light, which has passed the polarization plate 6, is rotated by 90°, while the light passes through the nematic liquid crystal 5 so as to be able to pass the polarization plate 7. In this way, the diaphragm making use of property of a matter is in a position for letting the light pass through when no voltage is applied.

When then an alternating voltage is applied between a selected split transparent electrode, and the common transparent electrode the orientation of the twist mode of the nematic liquid crystal between them is destroyed, whereby the rotatory polarization efficiency disappears. Thus, the direction of the polarization of the light incident on the nematic liquid crystal 5 is not rotated, whereby the light passes through the nematic liquid crystal 5 only to be prevented from travelling further by means of the polarization plate 7 in the next step. Thus, the diaphragm making use of a property of matter is in a position to prevent the light from passing through when a voltage is applied.

By properly selecting a split transparent electrode in accordance with the aperture value information at the side of camera and applying an alternating voltage to it, a certain determined aperture value can be obtained.

FIG. 1(2) shows an example of the composition of an electromagnetic diaphragm to be applied for the present invention.

In FIG. 1(2), a permanent magnet 1 having poles 1N and 1S (N pole and S pole) along the directions making a right angle to the rotation axis 1a and an electro-magnet 2 for giving a torque to the permanent magnet 1 are provided.

In the above-mentioned embodiment, each three sets of the permanent magnet and the electro-magnets are used, whereby the number of sets is not necessarily limited to three. The permanent magnet is provided with a pin 1b, which is in pin-slot engagement in the long hole 3b provided in the projection 2a in the connecting ring 3. Because the permanent magnets 1 are supported by means of the connecting ring 3 so as to be freely rotatable, three sets of the permanent magnets never deviate in phase. In the neighborhood of the projection 3a, fixing pins 4c and 4a are provided so as to control the rotation range of the connecting ring 3, namely of the permanent magnet 1. The connecting ring 3 has another projection 3c, on which is hung a spring whose other end is secured, so as to urge the connecting ring 3 along the clockwise or the counterclockwise direction in accordance with the angle position of the connecting ring 3. Hereby, it is supposed that the coils L of the electro-magnets 2 are connected in series and to the driving circuit to be explained later.

If no current is delivered to the coils L, the permanent magnets 1 remain at the position at which the connecting ring 3 in engagement with the permanent magnet 1 is restricted by means of the rotation limiting pins 4c or 4a, namely at the angle positions at which the line connecting 1N with 1S corresponds to the positions Pc or Po shown in the drawing.

When the permanent magnet 1 is at the position Pc and no current is supplied to the coils L, the permanent magnet 1 is urged along the clockwise direction by means of the spring 5 through the connecting ring 3. On the other hand, at 2a-1 of the core 2a of the magnet 2 at the side of Pc and at 2a-2 at the side of Po a S pole and a N pole is induced by means of the permanent magnet 1 so as to be attracted with 1N and 1S, so that a rotation strength along the counterclockwise direction takes place. This rotation strength is larger than that along the clockwise direction by means of the spring 5 as is explained later, the connecting pin stops by means of the fixing pin 4c.

When a current is supplied in such a manner that the 2a-1 of the core becomes the N pole while the 2a-2 becomes the S pole, by means of the repulsive strength between the N pole (2a-1) and 1N, the attractive strength between the N pole (2a-1) and 1S, the attractive strength between the S pole (2a-2) and 1N and the repulsive strength between the S pole (2a-2) and 1S the permanent magnet 1 is urged along the clockwise direction in such a manner that the permanent magnet 1 moves out of the position Pc into Pm by means of the sum of the rotation strength of the permanent magnet 1 and the urging strength of the spring 5. Pm is therefore almost at the middle between Pc and Po, at which the rotation strength given to the permanent magnet 1 and the permanent magnet 1 by means of the spring 5 disappears. If the current is further supplied, the permanent magnet 1 moves toward Po through Pm, whereby the urging strength of the spring 5 is in the reversed direction and the permanent magnet 1 is rotated against the strength of the spring (charging the spring 5) until the magnet 1 stops by means of the fixing pin 4a.

Hereby, by controlling the current running through the coils L, the rotation amount of the connecting ring 3 can be controlled so as to alter the opening amount of the diaphragm and fulfill the efficiency as an electromagnetic diaphragm.

FIG. 2 shows above-mentioned diaphragm making use of a property of matter or the above-mentioned electromagnetic diaphragm incorporated in a single lens reflex camera.

In the drawing, 20 and 21 are the photographing lenses 19 is the diaphragm making use of a property of matter or the electro-magnetic diaphragm arranged in the principal point plane, 22 is the quick return reflecting mirror, 23 is the focusing plate, 24 is the pentagonal prism, 25 is the eye piece lens, 26 is the focal plane shutter, 27 is the film and 28 is the driving circuit for the diaphragm making use of a property of matter and the electro-magnetic diaphragm.

FIG. 3 shows an embodiment of the driving circuit for the camera, having an aperture stop-down confirming device in accordance with the present invention.

DETAILS OF THE CIRCUIT ARE AS FOLLOWS (1) An automatic exposure single lens reflex camera with priority on aperture value is contemplated.

(2) The aperture stop-down operation is confirmed in accordance with the preset aperture value information at the time of the aperture stop-down confirmation or the shutter release.

(3) The diaphragm making use of a property of matter (liquid material) of area controlling system is used.

In the drawing, 30 is the diaphragm making use of the property of liquid crystal shown in FIG. 1 and A is the shutter control circuit. In the shutter control circuit, 31 is the photo-voltaic element (SPC) for carrying out the TTL light meaurement with opened diaphragm, 32 is the operational amplifier constituting the SPC head amplifier, and 33 is the diode for logarithmic compression inserted in the negative feedback circuit, 34 is the operational amplifier constituting an adder, whose inverting input terminal is connected to the output of the operational amplifier 32 through the resistance 35 and to the negative power source through the variable resistance 37 on which the ASA sensitivity information Sv of the film to be used and the preset aperture value information ΔAv are set. 36 is the negative feedback resistance of the operational amplifier 34, 37 is the change over switch being normally connected to the side a and changed over to the side b along with the shutter release operation. 38 is the condenser for storing the shutter time information (Tv) produced at the output of the operational amplifier 34 and 39 is the operational amplifier constituting a voltage follower, to whose output the base of the logarithmically prolonging transistor 40 is connected. 41 is the time constant condenser connected to the collector of the transistor 40, and 42 is the switching transistor connected in parallel thereto for starting the counting. 43 is the operational amplifier constituting the comparison circuit, whose inverting input terminal is connected to the collector of the transistor 40 and to whose non-inverting input terminal the standard voltage Vf is applied. 44 is the electromagnet connected to the output thereof so as to control the tail shutter curtain.

45 is a normally opened switch to be closed with the shutter release operation and 46 is the differentiating circuit for producing a positive differentiated pulse with the closing of the above switch 45. 47 is the one shot multi-vibrator to be triggered with the above differentiated pulse so as to produce one pulse. 48 is a switching transistor, to whose base the output is connected and to whose collector the electromagnet 49 for releasing the first retention is connected.

50 is a normally opened switch to be closed when the tail shutter curtain has run and 51 is a differentiating circuit for producing a positive differentiated pulse with the closing of the above switch 50. 52 is an RS flip-flop, whose set input is connected to the output of the above differentiating circuit 46 and whose reset input is connected to the output of the above differentiating circuit 51. 54 is a normally opened switch connected between the Q output thereof and the positive power source to be manually closed when the diaphragm is closed for confirming the field depth. 53 is a delay circuit connected to the Q output, whereby the delay time is set to be the one from the shutter release for allowing the leading shutter curtain to start until the start of the exposure. The output of 53 is connected to the base of the switching transistor 42 for starting the time counting.

60 is the constant voltage generating circuit and 61 is a potentiometer for producing an analog voltage corresponding to the preset aperture value information. The larger the F value of the preset aperture, the higher is the analogue voltage. In the state shown in the drawing, the aperture preset means is provided at the side of the interchangeable lens, being connected to the circuit at the side of the camera body by means of the connecting terminal group 61'. 62 is an analog-to-digital converter for converting the analog voltage coming from 61 into a binary code in 5 bits. AN1-AN5 are AND gates with two inputs, whereby the one inputs are connected to each output of the above A/D converter, while the other inputs are connected to the Q output of the RS flip-flop circuit 52. 63 is the decoder for converting the binary code with 5 bits into a decimal code with 24 bits. OR1-OR23 are OR gates with 2 inputs, whereby the one inputs are connected to the outputs 1-23 of the above decoder, while the other inputs of OR1-OR22 are connected to the outputs of OR2-OR23 and the other input of OR23 is connected to the output 24 of the decoder 24.

EX1-EX24 are exclusive OR gates with two inputs, whereby the one input of EX1-EX23 are connected to the outputs of the above OR gates OR1-OR23, while the one input of EX24 is connected to the output 24 of the above decoder 63. The other inputs of EX1-EX24 are connected to the pulse generating circuit. The outputs of the exclusive OR gates EX1-EX24 are connected to the split transparent electrodes 3a-3h of the diaphragm making use of a property of matter shown in FIG. 1, whereby in the case of the present embodiment the electrode is split into 24 elements in order to obtain an intermediary value. Further, the common transparent electrode 4 of the diaphragm making use of a property of matter is connected to the output of the pulse generating circuit PG2. Further, because the diaphragm 30 making use of a property of matter is provided at the side of the interchangeable lens, in order to connect it to the driving circuit at the side of the camera body, the connecting terminals a-0 - a-24 and b-0 - b-24 are provided.

The operation of the circuit constructed as above will be explained below.

Firstly, the operations, except those at the time of the shutter release or the aperture stop-down confirmation, will be explained. Because the Q output of the RS flip-flop circuit 52 is on L level at this time, the AND gates AN1-AN5 are not opened and their outputs are all on L level, the output of the decoder 63 are all on L level. Thus, the exclusive OR gates EX1-EX24 produce pulse voltages with the same phase as that of the output pulses from the pulse generating circuit PG2, and therefore, the diaphragm 30 making use of a property of matter in such a manner that the total plane of the diaphragm is transparent.

Below, the operation at the time of the aperture stop-down confirmation will be explained.

In this case, the switch 54 is closed by means of the operation member OBT. Thus, the Q output terminal is on H level. To the A/D converter 62, an analog voltage corresponding to the preset aperture value information is delivered, whereby the converter delivers a binary code with 5 bits corresponding to the input voltage. The Q output terminal of RS flip-flop 52 is on H level so that the AND gates AN1-AN5 are opened so as to deliver the binary code output of the A/D converter 62. The binary code is converted into a decimal code by means of the decoder 63 in the next step, whereby the H level signals are delivered only from the output terminals corresponding to the input binary codes.

When now, out of the outputs of the decoder 63, the output 1 is selected so as to be on H level, other outputs are on L level, so that only one output of the OR gate OR1 is on H level, while all the inputs of OR2-OR23 are on L level in such a manner that only the output of OR1 is on H level, while the outputs of OR2-OR23 are on L level. Thus, form the exclusive OR gate EX1, a pulse in the phase reversed to that of the output pulse is delivered from the pulse generating circuit PG2, while the pulses in the same phase are delivered from EX2--EX24. In this state, only the parts in the diaphragm making use of a property of matter connected to the output of EX1 assume the light shading state.

When the output 4 of the decoder 63 is selected to be on H level, one input of the OR gate OR4 is on H level so that the output is on H level. Thus, one input of OR3 is on H level, so that the output is on H level. In the same way, the outputs of OR2 and OR1 are on H level. Namely, the outputs of the OR gates OR1-OR4 are on H level, while the outputs of the OR gates OR5-OR7 are on L level. Thus, the phase of the output pulses from the exclusive OR gates EX1-EX4 are inverted to that of the output pulse from the pulse generating device PG2, while that of the output pulses from the EX5-EX8 are the same. In this state, only the electrode elements of the diaphragm 30 to which elements the outputs of the exclusive OR gates EX1-EX4 are connected assume the light shading state. In this way, the diaphragm closing operation at the time of the aperture stop-down confirmation is carried out.

Below, the operation at the time of the shutter release will be explained.

From the output of the SPC head amplifier 32, an analog voltage corresponding to the object brightness and the F value of the totally opened photographing lens is delivered and calculated with the preset aperture value information, and the ASA sensitivity information of the film to be used by means of the adder in the next step, whereby from the output an analog voltage corresponding to the shutter time information Tv to be controlled is delivered and stored in the condenser 38.

Along with the shutter release, the switch 45 is closed, whereby the differentiating circuit 46 produces a positive differentiated pulse so as to trigger the one shot multi-vibrator 47 in the next step, whereby, by means of the output one pulse, the switching transistor 48 is brought in the switched on state so as to release the first retention in such a manner that the mirror is raised and the leading shutter curtain starts to run. Further, by means of the positive differentiated pulse from the differentiating circuit 46, the RS flip-flop circuit 52 is set, whereby the Q output is on H level, so as to open the AND gates AN1-AN5 in such a manner that in the same way at the time of the diaphragm closing confirmation, the diaphragm 30 making use of a property of matter is closed down to a certain aperture value determined in accordance with the aperture value information preset on the potentio-meter 61 at the side of lens. Further, after the lapse of a certain time after the inversion of the level of the Q output, the output of the delay circuit 53 is on H level so as to bring the switching transistor 42 for starting the time counting into the switched off state. Further, at the same time with the above release, the change over switch 37 is changed over from the side a to the side b, whereby because the operational amplifier 39 delivers the voltage stored in the switching transistor 42, as soon as the switching transistor 42 is brought into the switched off state, the time constant condenser 41 starts to be charged with the current having the logarithmically prolonged output voltage. As soon as the charge voltage has reached a certain determined level, the level of the output of the operational amplifier 43 constituting the comparison circuit is inverted into H, whereby the current supply to the electro-magnet 44 for controlling the tail shutter curtain is interrupted so as to allow the tail shutter curtain to start to run and terminate the exposure.

FIG. 4 shows the arrangement of the aperture stop-down confirmation switch 54 in the camera. In FIG. 4(1), 64 is the camera body, 62 is the pentagonal prism cover, 63 is the lens mount ring, 65 is the quick return reflecting mirror, and 67 is the insulated lever to be pushed at the time of the diaphragm closing confirmation, being rotatable around the shaft 66. 54 is the aperture stop-down confirmation switch and 60 and 61 are the contacts.

a-1-a-24 are the electrical pieces for connecting the camera body to the interchangeable lens. In the state shown in the drawing, the switch 54 is in the opened state by means of the elasticity of the piece 60.

When the lever 67 is operated in order to confirm the diaphragm closing, the lever 67 is rotated along the counterclockwise direction so as to bring the piece 60 in contact with the piece 61 and close the switch 54.

FIG. 4(2) shows an aperture stop-down confirming switch in operative engagement with the shutter release operation. 70 is the shutter release button and 71-73, 77 are the electrode pieces, each being separated and insulated by means of the insulation members 74-76. Further, the piece 77 is connected to the positive power source. The pieces 77 and 72 constitute the aperture stop-down confirmation switch 54, while the pieces 77 and 73 constitute the release switch 45. Along with the first stroke of the shutter button, the pieces 70 and 71 are brought into the conductive state, so as to actuate the light measuring circuit, while along with the second stroke, the aperture stop-down confirming switch 54 is closed so as to actuate the aperture stop-down operation making use of a property of matter (or the electro-magnetic diaphragm) and along with the third stroke, the release switch 45 is closed so as to start the shutter release.

Figure 5:
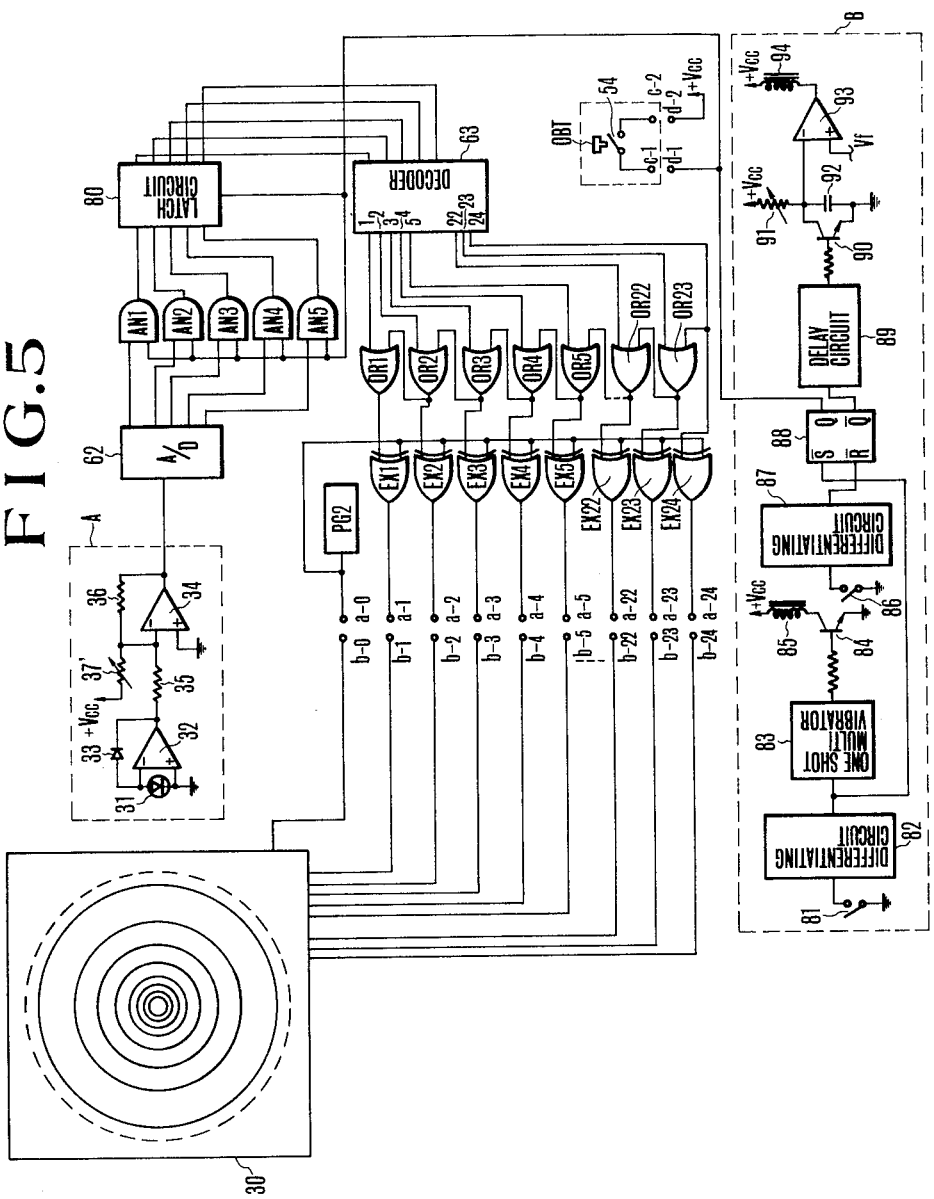
FIG. 5 shows the second embodiment of the electrical circuit for the camera in accordance with the present invention.

FIG. 5 shows the second embodiment of the driving circuit in accordance with the present invention.

The details of the above circuit is as follows.

(1) The automatic exposure single lens reflex camera with priority on shutter time is contemplated.

(2) The aperture stop-down operation is carried out in accordance with the aperture value information latched as the result of the light measurement calculation at the time of the diaphragm closing or the shutter release.

(3) The diaphragm making use of a property of matter (liquid crystal) with area control system is used.

In the drawing, the members having the same figures as those in FIG. 3 are the same members, so that their explanation is omitted here.

In the light measurement calculation circuit A, the variable resistance 37' connected to the inversing input terminal of the operational amplifier 34 constituting an adder is intended to be input with the ASA sensitivity information of the film to be used and the preset shutter time information delivering the closing step number information $\Delta Av$ of the diaphragm to be controlled from the output of the operational amplifier 34. 80 is the latch circuit for latching the binary code of the diaphragm closing step number information delivered from the AND gate AN1-AN5 at the time of the aperture stop-down. 54 is a normally opened switch to be closed at the time of the aperture stop-down confirmation, being provided at the side of the interchangeable lens in the present circuit, whereby the terminals c-1, c-2 at the side of the lens are connected to the terminals d-1, d-2 at the side of the camera body.

B is the shutter control circuit. In the circuit B, 81 is a switch to be closed with the operation of the shutter release button, and 82 is a differentiating circuit for delivering a negative differentiated pulse along with the closure of the above switch 81. 83 is a one-shot multi-vibrator to be triggered with the above negative differentiated pulse so as to produce one pulse. 84 is a switching transistor to whose base the output is connected through a resistance and to whose collector the electro-magnet 85 for releasing the first retention is connected. 86 is a switch to be closed when the tail shutter curtain (hereby a focal plane shutter) has run, and 87 is a differentiating circuit for producing a negative differentiated pulse with the closing of the above switch 86. 88 is an RS flip-flop circuit, whose set and reset input are connected to the output of the above differentiating circuits 82 and 87. Further, the $\overline{Q}$ output is delivered to the delay circuit 89.

90 is a switching transistor for starting the time counting, whose base is connected to the output of the above delay circuit 89. 91 is a resistor variable in accordance with the preset shutter time information and 92 is a time constant condenser being connected in parallel to the above switching transistor 90. 93 is an operational amplifier constituting a comparator, whose non-inverting input terminal is connected to the connecting point of the above variable resistance 91 with the condenser 92 and to whose inverting input terminal the standard voltage Vf is applied. 94 is an electro-magnet connected to the output of the operational amplifier 93 so as to control the tail shutter curtain.

Below, the operation of the circuit composed as mentioned above will be explained.

Firstly, the operation except that at the time of the shutter release or the aperture stop-down confirmation will be explained.

Because at this time, the Q output of the RS flip-flop circuit 88 is on L level, the AND gates AN1-AN5 are not opened and therefore all of the outputs are on L level, so that all the outputs of the latch circuit 80, the decoder 63 and the OR gates OR1-OR23 are on L level. Thus, from the exclusive OR gates EX1-EX24, the pulse voltage in the same phase as that of the output pulse of the pulse generating circuit PG2 are delivered, so that the diaphragm 30 making use of a property of matter is switched off and thus its total plane is in the transparent state.

Below, the operation at the time of the aperture stop-down confirmation will be explained.

Because, in this case, the normally opened state 54 is closed, the potential at the above Q output terminal is on H level. To the A/D converter 62 an analog voltage corresponding to the aperture value information $\Delta Av$ as the result of the light measurement calculation is applied, while from the output a binary code with 5 bits corresponding to the input voltage is delivered. Because the Q output of the RS flip-flop 88 is on H level, the AND gates AN1-AN5 are opened and deliver the output binary code of the A/D converter 62 from the outputs. The binary code is latched by means of the latch circuit 80 and converted into a decimal code with the decoder 63 in the next step, whereby only the output at the address corresponding to the input binary code is on H level.

When now the output 1 out of the outputs of the decoder 63 is selected to be on H level, other outputs are on L level, only one input of the OR gates OR1 is on H level and all the inputs of OR2-OR23 are on L level, so that only the output of OR1 is on H level, while the outputs of OR2-OR23 are on L level.

Thus, from the exclusive OR gate EX1, a pulse in the phase reversed to that of the output pulse from the pulse generating circuit PG2 is delivered. In this state only the elements of the diaphragm 30 to which the output of EX1 is connected assumes the light shading state.

When the output 4 out of the outputs of the decoder 39 is selected to be on H level, the one input of the OR gate OR4 is on H level so that its output is on H level. Thus, one input level of OR3 is on H level so that its output is on H level and thus the outputs of OR2, OR1 are on H level.

Namely, the outputs of the OR gates OR1-OR4 are on H level, while the outputs of the OR gates OR-5-OR7 are on L level. Thus, the phase of the output pulses of the exclusive OR gates EX1-EX4 is inverted to that of the output pulse of the pulse generating circuit PG2, while the phase of the output pulses of EX5-EX8 is the same. In this state, only the electrode elements of the diaphragm 30 to which the outputs of the exclusive OR gates EX1-EX4 are connected assume the light shading state.

Below, the operation at the time of the shutter release will be explained.

When the shutter release button (not shown in the drawing) is operated, the switch 81 is closed and the differentiating circuit 82 in the next step produces a negative differentiated pulse so as to trigger the one-shot multi-vibrator 83 in the next step, whereby one pulse appears at the output of the multi-vibrator 83. During the period corresponding to the pulse width, the switching transistor 84 in the next step is in the switched on state so as to supply current to the coil 85 and release the first retention of the shutter in such a manner that the quick return mirror starts to be raised and the leading shutter curtain starts to run so as to start the exposure after the mirror has been raised.

Further, the negative differentiated pulse from the differentiating circuit 82 sets the RS flip-flop circuit 88, whose Q output is on H level so as to open the AND gates AN1-AN5 in such a manner that in the same way as at the time of the above diaphragm closing confirmation, the diaphragm closing operation of the diaphragm 30 is carried out.

Further, in synchronization with the inversion of the level of the Q output of the RS flip-flop circuit 88 into H the $\bar{Q}$ output is on L level and after the lapse of a certain delayed time, the output of the delay circuit 89 is on L level so as to bring the switching transistor 90 into the switched off state, whereby the time constant condenser 92 starts to be charged through the variable resistance 91 for setting the preset aperture value information. When the charge voltage of the time constant condenser 92 has reached a certain determined value, the level of the non-inverting input of the comparison circuit 92 becomes higher than that of the inverting input level, whereby the output is on H level so as to interrupt the current supply to the coil of the electromagnet 94 for controlling the tail shutter curtain in such a manner that the tail shutter curtain starts to run so as to terminate the exposure operation. When the tail shutter curtain has run, the switch 86 is closed, whereby the differentiating circuit 87 produces a negative differentiating pulse so as to reset the RS flip-flop circuit 88 in such a manner that the initial state is resumed. In this state, the Q output of the RS flip-flop circuit 88 is on L level, so that the diaphragm closing operation is released and the AND gates AN1-AN5 are closed so as to stop the closing operation of the diaphragm 30.

Figure 6:
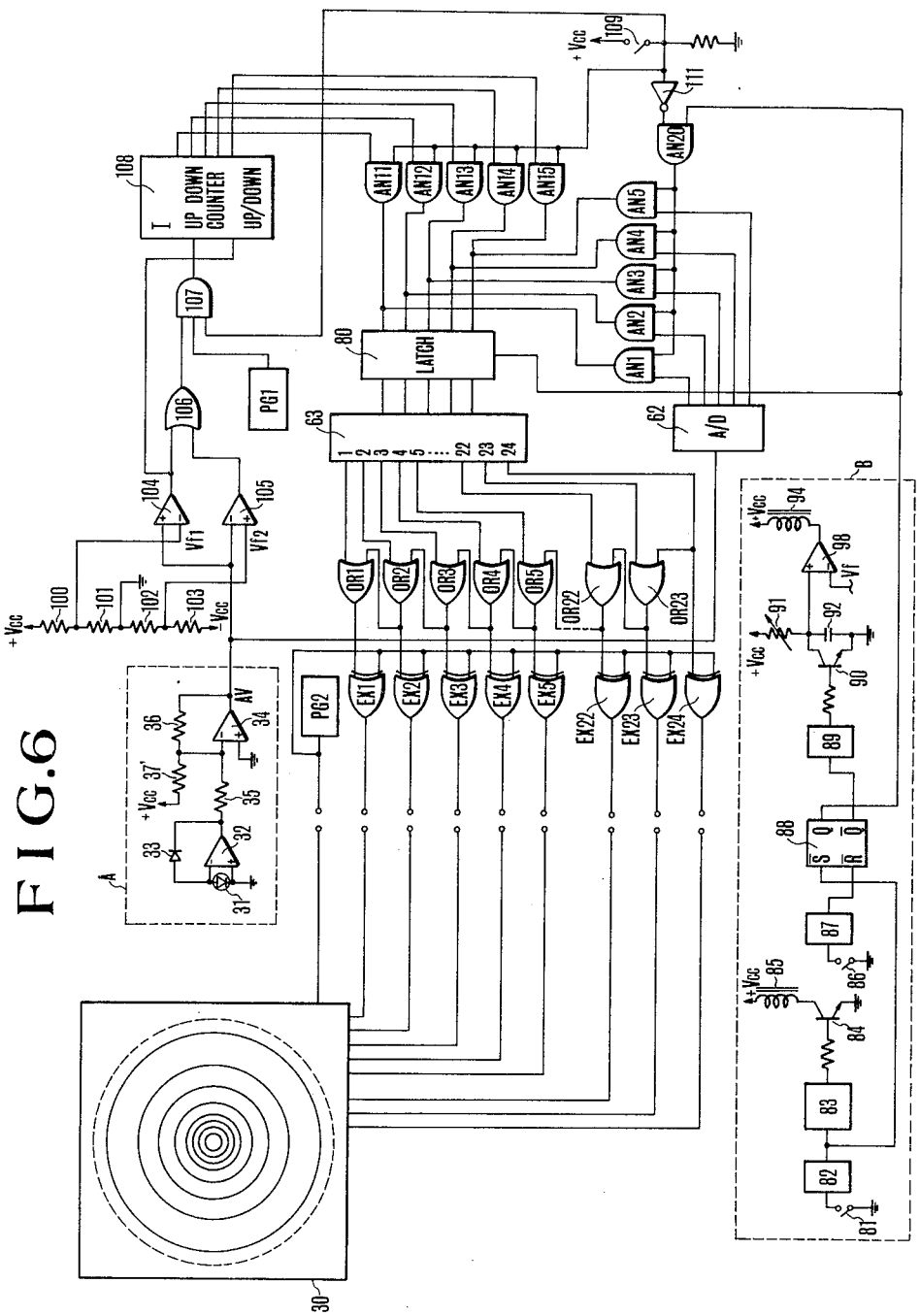
FIG. 6 shows the third embodiment of the electrical circuit in accordance with the present invention.

FIG. 6 shows the third embodiment of the driving circuit of the present invention.

The details of the above circuit is as follows.

(1) The automatic exposure single lens reflex camera with priority on shutter time is contemplated.

(2) The aperture stop-own operation is carried out in accordance with the latch stored aperture value information as the result of the light measurement calculation at the time of the shutter release.

(3) At the time of the aperture stop-down confirmation, the diaphragm closing is controlled by means of the servo-control system in such a manner that the amount of the diaphragm closure is varied in accordance with the object brightness and so on.

(4) The diaphragm making use of a property of matter (liquid crystal) with area control system is used.

In the drawing, the members having the same figures as those in FIG. 5 are the same members having the same efficiency, so that the corresponding explanation is omitted here.

A is the light measurement calculation circuit, while B is the shutter control circuit.

104 and 105 are operational amplifiers for constituting a comparison device, whereby the non-inverting input of 104 and the inverting input of 105 are connected to the output of the operational amplifier 34 in the light measurement calculation circuit A. 100 and 101 are resistances for setting the standard voltage level, whereby at the voltage dividing point of 100 and 101 the inverting input level Vf1 of the operational amplifier 104 is produced, while at the voltage dividing point of 102 and 103 the non-inverting input level Vf2 of the operational amplifier 105 is produced. Further, the voltage dividing point of the resistances 101 and 102 is grounded. 106 is the exclusive OR gate with two inputs, each of which inputs is connected to the output of 104 respectively 105. 107 is an AND gate with three inputs, which inputs are connected to the output of the exclusive OR gate 106, the output of the pulse generating circuit PG1 respectively the positive power source through the aperture stop-down confirmation switch 109 to be explained later. 108 is an up and down counter, whose input is connected to the output of the above AND gate 107 and whose up and down input is connected to the output of the operational amplifier 104, whereby from the 5 bit output, the count number in binary code is delivered. AN11-AN15 are AND gates with 2 inputs, the one of which the inputs is connected to the output of the up and down counter 108 and all of the others of which counters are connected to the positive power source through the aperture stop-down confirmation switch 109.

62 is an A/D converter, whose input is connected to the output of the operational amplifier 34 in the light measurement calculation circuit A, whereby the 5 bit output code is delivered to the one input of the AND gates AN1-AN5. All of the outputs of the AND gates AN1-AN5 and AN11-AN15 are delivered to the latch circuit 80.

111 is an inverting circuit, whose input is connected to the positive power source through the aperture stop-down confirming switch 109 and whose output is connected to the one input of the AND gate AN20. The other input of AN20 is connected to the Q output of the flip-flop circuit 88 in the shutter control circuit B, while the output of AN20 is connected to the other inputs of the AND gates AN1-AN5.

The operation of the present embodiment composed as above will be explained below.

Firstly, the operation of the above circuit at the time of the shutter operation will be explained. As is explained in accordance with FIG. 5, at this time the Q output of the flip-flop circuit 88 in the shutter control circuit B is on H level. When, the aperture stop-down confirmation switch 109 is opened, the input of the inversing circuit 111 is on L level, while the output is on H level, whereby the output of the AND gate AN20 is on H level. Thus, the AND gates AN11-AN15 are closed, while the AND gates AN1-AN5 are opened in such a manner that a 5 bit binary code corresponding to ΔAv information is delivered from the AND gates AN1-AN5. The output is latched with the latch circuit 80. After then, in the same way as in the case shown in FIG. 5, the closing operation of the diaphragm 30 making use of a property of matter is carried out.

Below, the servo-control EE at the time of the aperture stop-down confirmation operation will be explained.

In the case of the servo-EE control system of the above circuit, the output of the up and down counter 108 is varied in such a manner that the analog output voltage of the operational amplifier 34 in the light measurement calculation circuit A is on 0 level so as to control the closing of the diaphragm 30.

Namely, the output of the amplifier 32 in the state in which the diaphragm is stopped down to a certain determined value is Bv-Av1 (Av1: aperture value when the diaphragm is stopped), which is calculated with the preset shutter time (Tv) and the ASA sensitivity (Sv), whereby the output of the amplifier 34 is represented in:

$$Bv - Av1 + Sv - Tv \ldots \quad (1)$$

On the other hand, the APEX relation is represented in $Av + Tv = Sv + Bv$, while the condition for obtaining the proper exposure is represented in $Bv - Av1 + Sv - Tv = 0$. Consequently, when Av1 assumes a value in such a manner that $Bv-Av1+Bv-Tv=0$, namely when the diaphragm is stopped down to $Av1$ ($=Bv+Sv-Tv$), the proper exposure can be obtained. Hereby, the output of the amplifier 34 is on 0 level. Consequently, by changing the output of the up and down counter in such a manner that the output of the amplifier 34 is on 0 level, the aperture stop-down confirmation operation can be carried out with the aperture value necessary for obtaining the proper exposure.

Below, the aperture stop-down confirmation operation will be explained.

At first, the aperture stop-down confirmation switch 109 is closed. Thus, the input of the inversing circuit 111 is on H level so as to open the AND gates AN11–AN15. Further, the output of the inversing circuit 111 is on L level so that the output of the AND gate AN20 is on L level, whereby the AND gates AN1–AN5 are closed.

Consequently, to the latch circuit 80 the 5 bit binary code is delivered from the up down counter 106.

In the state in which the closing amount of the diaphragm 30 has not reached the determined value, the output voltage Av of the operational amplifier 34 in the light measurement calculation circuit A increases in such a manner that $Av>Vf1>Vf2$, so that the output of the operational amplifier 104 is on H level, while the output of the operational amplifier 105 is on L level, whereby the output of the OR gate 106 is on H level. Because the aperture stop-down confirmation switch 109 is closed, the AND gate 107 is opened in such a manner that the output pulse of the pulse generating circuit PG1 is delivered from the output of the AND gate 107 to the input terminal of the up down counter 108. Because the up down input terminal of the up down counter 108 is on H level, the input pulse is up counted in such a manner that the 5 bit binary output code increases. This output code is delivered to the decoder 63 through the AND gates AN11–AN15 and latch circuit in such a manner that by means of the afore-mentioned operation, the closing amount of the diaphragm 30 increases.

When now the closing amount of the diaphragm 30 is too great, the output voltage Av of the operational amplifier 34 decreases in such a manner that $Av<Vf2>Vf1$, whereby the output of the operational amplifier 104 is on L level, while the output of the operational amplifier 105 is on H level in such a manner that the output of the exclusive OR gate 106 is on H level so as to open the AND gate 107 and the output pulse of the pulse generating circuit PG1 is delivered to the input terminal of the up down counter 108. Because now the up down input is on L level, the counter 108 counts down the input pulses in such a manner that the 5 bit binary output code decreases. Thus, the closing amount of the diaphragm 30 decreases.

When the closing amount has reached a proper level, the output Av of the operational amplifier 34 is almost on 0 level (ground level) in such a manner that $Vf2<Av<Vf1$. Thus the output of the operational amplifiers 104 and 105 and that of the exclusive OR gate 106 are on L level so as to close the AND gate 107 and interrupt the input pulses to the up down counter 108, which stores the value so far counted so as to keep the closing amount of the diagraphm at the proper value.

The servo-EE control of the above circuit is carried out as explained above.

Further, by setting the standard voltages Vf1 and Vf2 of the operational amplifiers 104 and 105 in the above circuit in such a manner that $Vf1<Vf2$ non-sensitive zone of the servo-EE control is provided.

Further, the aperture stop-down confirmation switch 109 can be arranged either at the side of the camera body or at the side of the interchangeable lens as in the case of the embodiment shown in FIG. 5.

Figure 7:
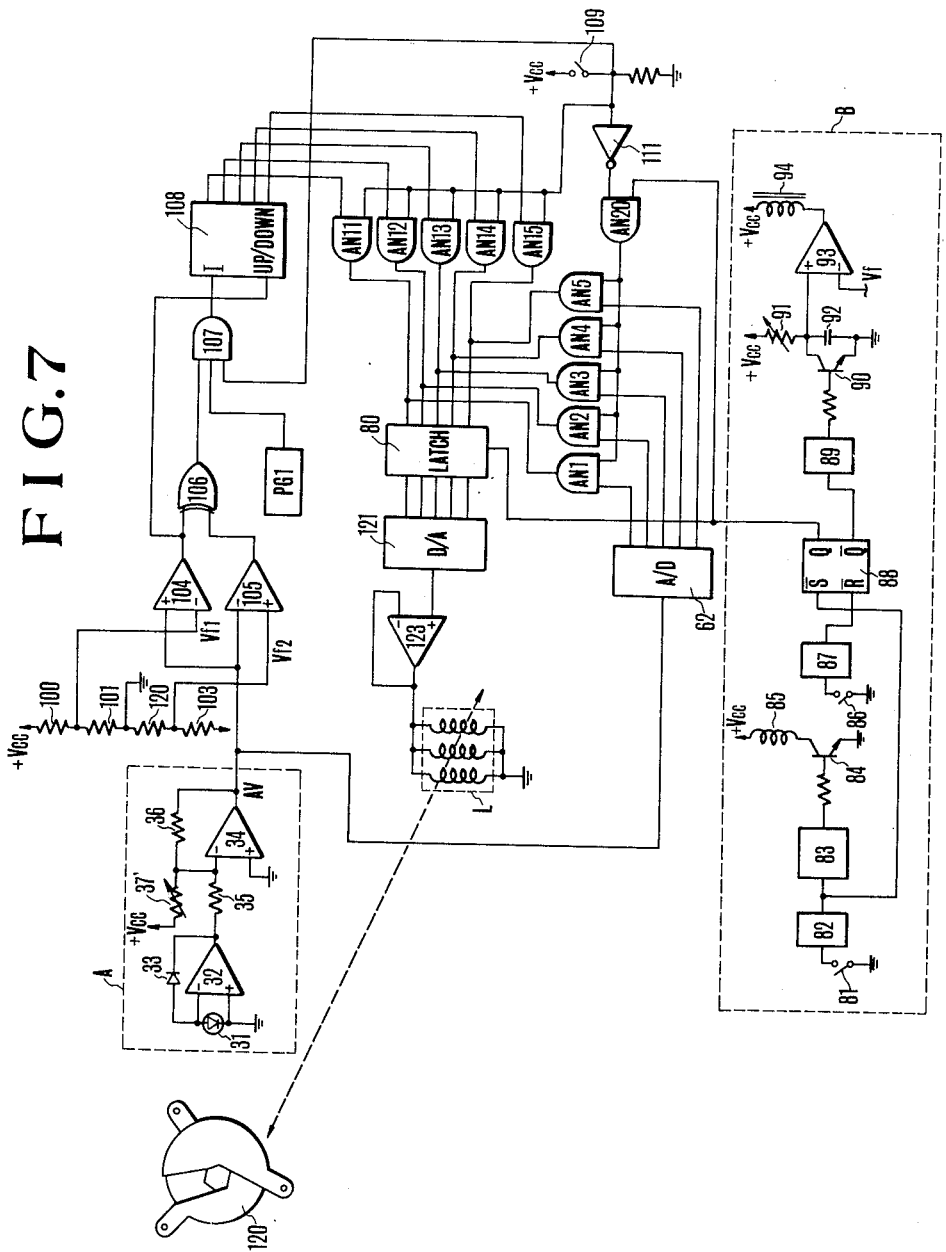
FIG. 7 shows the fourth embodiment of the electrical circuit in accordance with the present invention.

FIG. 7 shows the fourth embodiment of the driving circuit in accordance with the present invention.

The present circuit is almost same as that of the embodiment shown in FIG. 6, whereby the only difference is that the electro-magnetic diaphragm shown in FIG. 2 is made use of.

The members having the same figures as those in FIG. 6 are the same members having the same efficiency, so that corresponding explanation is omitted here. 120 is the electromagnetic diagraphm device shown in FIG. 2, and 121 is the D/A converter connected to the output of the latch circuit 80, so as to convert the 5 bit input binary code into an analogue voltage. 123 is the operational amplifier for constituting a voltage follower, whose non-inversing input is connected to the output of the above D/A converter 121 and whose output is connected to the coil of the electromagnetic diaphragm shown in FIG. 2.

The operation of the present circuit is almost same as that of the embodiment shown in FIG. 6. The only difference is that the electromagnetic diaphragm 120 of the present circuit is driven with the binary code converted into an analogue voltage by means of the D/A converter 121, while the diaphragm 30 making use of a property of matter is driven by means of the output binary code of the latch circuit 80 in a digital way.

Figure 8:
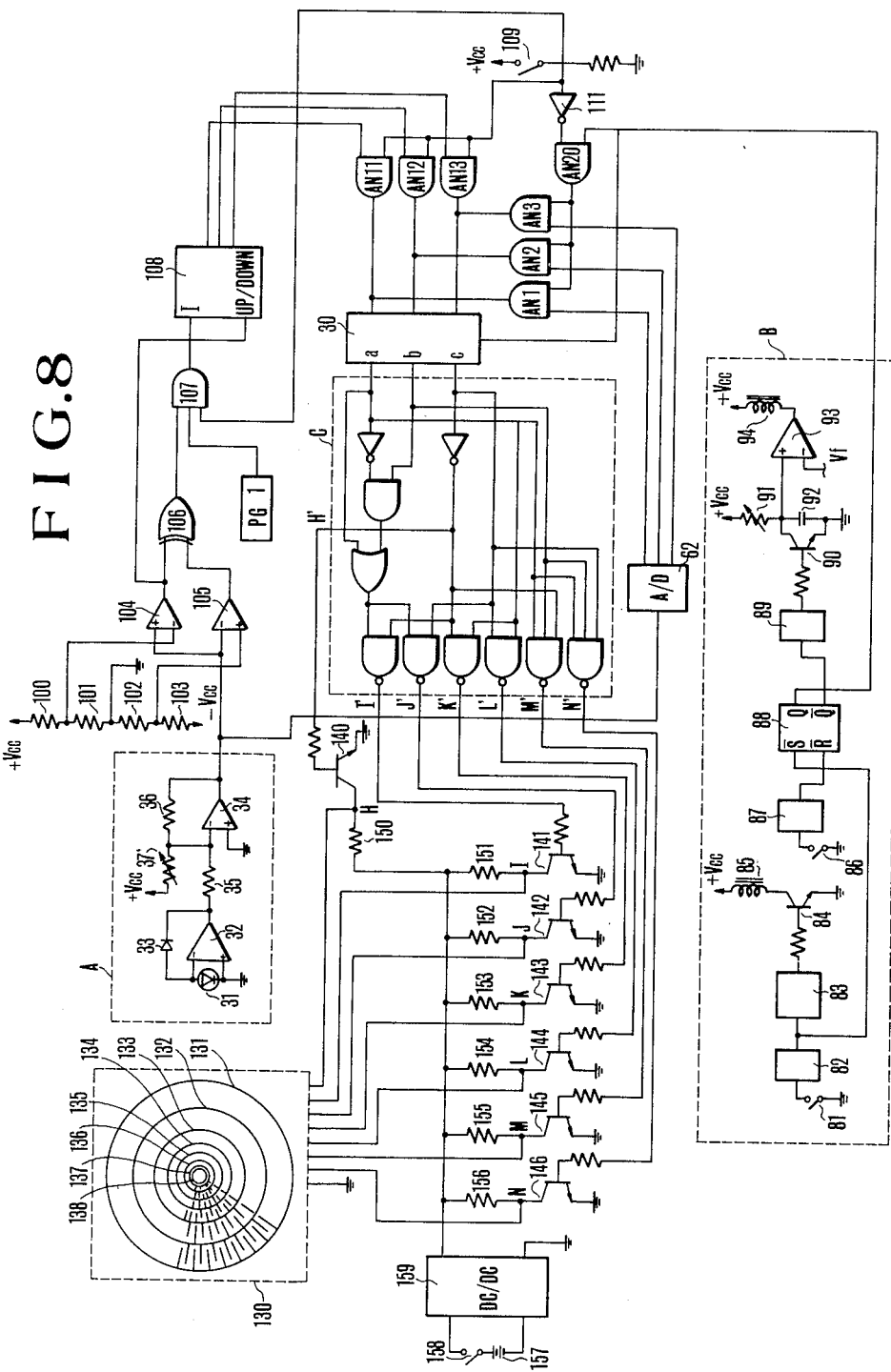
FIG. 8 shows the fifth embodiment of the electrical circuit in accordance with the present invention.

FIG. 8 shows the fifth embodiment of the driving circuit in accordance with the present invention.

The details of the present circuit are almost same as those of the embodiment shown in FIG. 6. The only difference is that a transparent ferroelectric ceramic (PLZT) 130 is used. PLZT presents double refraction phenomenon, when a direct electric field is applied along the direction of plane, giving a rotary polarization to the incident light. Thus, by properly combining PLZT with polarizer and analyzer and by properly selecting the voltage to apply, the light shading state can be realized. In the case of the present embodiment, by making use of the above phenomenon of PLZT and by properly selecting the shape of the transparent electrodes to be formed on the surface of PLZT, a diaphragm making use of a property of matter is realized. The members having the same figures as those in FIG. 7 are the same members having the same efficiency. 131–133 are the comb shaped transparent electrodes formed on the surface of PLZT (although the electrodes are formed only on a part, they are formed in a circular shape in practice), and C the logic converting circuit connected to the 3 bit outputs a, b, c of the latch circuit 80. Table 1 shows logic values between the outputs H'–N' of C and the inputs a, b and c. 140–146 are the switching transistors whose bases are respectively connected to the outputs H'–N' of the converting circuit C. 150–156 are the collector resistances. The collector terminals H–N of the switching transistors 140–146 are respectively connected to the comb shaped transparent electrodes 131–137 of the diaphragm PLZT. The comb shaped transparent electrode 138 is grounded. 157 is the power source of camera, 158 is the main switch of camera and 159 is a step up DC-DC converter for stepping up the input voltage up to several hundred volt. This step up voltage value is set so as to match the characteristics of PLZT best. The output of the DC-DC converter 156 is connected to the collector resistances 150–156.

TABLE 1

| a | b | c | H' | I' | J' | K' | L' | M' | N' | H | I | J | K | L | M | N |
|---|---|---|----|----|----|----|----|----|----|---|---|---|---|---|---|---|
| 0 | 0 | 0 | 1  | 1  | 1  | 1  | 1  | 1  | 1  | 0 | 0 | 0 | 0 | 0 | 0 | 0 |
| 0 | 0 | 1 | 0  | 1  | 1  | 1  | 1  | 1  | 1  | 1 | 0 | 0 | 0 | 0 | 0 | 0 |
| 0 | 1 | 0 | 1  | 0  | 1  | 1  | 1  | 1  | 1  | 0 | 1 | 0 | 0 | 0 | 0 | 0 |
| 0 | 1 | 1 | 0  | 1  | 0  | 1  | 1  | 1  | 1  | 1 | 0 | 1 | 0 | 0 | 0 | 0 |
| 1 | 0 | 0 | 1  | 0  | 1  | 0  | 1  | 1  | 1  | 0 | 1 | 0 | 1 | 0 | 0 | 0 |
| 1 | 0 | 1 | 0  | 1  | 0  | 1  | 0  | 1  | 1  | 1 | 0 | 1 | 0 | 1 | 0 | 0 |
| 1 | 1 | 0 | 1  | 0  | 1  | 0  | 1  | 0  | 1  | 0 | 1 | 0 | 1 | 0 | 1 | 0 |
| 1 | 1 | 1 | 0  | 1  | 0  | 1  | 0  | 1  | 0  | 1 | 0 | 1 | 0 | 1 | 0 | 1 |

Below, the operation of the circuit composed as mentioned above will be explained.

The servo-EE control system is the same as that of the embodiments shown in FIGS. 6 and 7. Hereby, the driving system of PLZT 130 is mainly explained. Now let us suppose that the output of the latch circuit 80 is [0 1 1]. From the Table 1, the output of the logic converting circuit C is [0 1 0 1 1 1 1], whereby the switching transistors 141, 143, 144, 145 and 146 are brought in the switched on state, while the switching transistors 140 and 142 are brought in the switched off state. Thus, the collector terminals H and J are on H level, while other collectors I, K, L, M, N are on L level. In this state, a high direct voltage is applied between the comb shaped transparent electrodes 131 and 132, 132 and 133 and 133 and 134 in such a manner that these parts present a double refraction so as to be in the light shading state. Thus, the diaphragm 130 assumes the state closed by 3 steps.

When the 3 bit output of the latch circuit 80 is [1 0 1], as is shown in Table 1 the output of the logic converting circuit C is [0 1 0 1 0 1 1], whereby the switching transistors 141, 143, 145, 146 are closed, while 140, 142 and 144 are opened. Thus, the collector terminals H, J, L are on H level, while I, K, M, N are on L level. In this state, a high direct voltage is applied between the comb shaped transparent electrodes 131 and 132, 132 and 133, 133 and 134, 134 and 135 and 135 and 136 and these parts present a double refraction so as to be in the light shading state. Thus, the diaphragm assumes the state closed by 5 steps.

In the way as mentioned above, the closing operation of the diaphragm making use of the property of PLZT is carried out.

In the afore-mentioned embodiment, liquid crystal and PLZT are made use of as matter, whereby the matter is not limited to them. Further the composition of the electromagnet is not limited to the moving magnet type shown in FIG. 1(2). Further, the shape of the diaphragm is not limited to a circle nor a hexagon and can be any shape, so far as the optical efficiency is fulfilled.

Further, in the case of the diaphragm making use of a property of matter, it is not always necessary that the diaphragm is closed from the circumference, but it is possible to close it from the center or any part so as to be optional from the optical view point. Further, for all the embodiments the aperture stop-down switch 54 can be provided either at the side of the camera body or at the side of the interchangeable lens.

In short, all those embodiments which carry out the aperture stop-down operation in a simple way by closing an electrical switch, making use of a diaphragm making use of a property of matter or an electro-magnetic diaphragm belong to the present invention.

As so far explained in accordance with the embodiments, the present invention offers a convenient aperture stop-down confirmation device making use of a property of matter or electro-magnetism for a single lens reflex camera, realizing an aperture stop-down confirmation following the variation of the object brightness and so on for the automatic exposure mode with priority on shutter time, which is so far impossible. Thus, the number of the mechanical parts can largely decreased, contributing much to decrease the weight, lower the cost and so on, which is quite advantageous.

What is claimed is:

1. A camera comprising:
   (a) a diaphragm member, said member having a property for changing the light transmittance so as to form a light admitting part and the light shading part and controlling the aperture value with the area of the light admitting part;
   (b) an exposure information signal forming means, said means forming the exposure information signal;
   (c) a control circuit, said circuit deciding the area of the light admitting part of the property matter in accordance with the exposure information signal;
   (d) a diaphragm closing confirmation switch; and
   (e) a control signal forming means, said means forming a control signal for making the control circuit operative by means of the operation of the switch.

2. A camera comprising:
   (a) a diaphragm device, said device including a diaphragm blade member for controlling an aperture and an electromagnetic means for driving the blade member, said blade member being driven by addition of electrical signal to the electromagnetic means, and returning to its initial position by the disappearance of the electrical signal, and said electromagnetic means controlling the driving amount of the blade means in correspondence to the amount of the electrical signal added thereto, whereby the diaphragm aperture is determined in correspondence to the amount of the electrical signal added to the electromagnetic means;
   (b) exposure information signal forming means, said means forming an exposure information signal;
   (c) a control circuit, said circuit applying the electrical signal to the electromagnetic means with a value corresponding to the exposure information signal so as to control the aperture;
   (d) an aperture stop-down confirmation switch; and
   (e) control signal forming means, said means forming a control signal for making the control circuit operative by means of the operation of the switch.

3. A camera in accordance with claim 1 or 2, wherein the exposure information signal forming means including a light measuring circuit for producing an output corresponding to the object brightness.

4. A camera in accordance with claim 1, wherein the exposure information signal forming means forming the output corresponding to the preset aperture.

5. A camera comprising:
   (a) a diaphragm member, said member having a property for changing a light transmittance so as to form a light admitting part and a light shading part and controlling the aperture value with the area of the light admitting part;
   (b) an exposure information signal forming means, said means forming the exposure information signal;
   (c) a control circuit, said circuit deciding the area of the light admitting part of the property matter in accordance with the exposure information signal;
   (d) a release operation means;
   (e) an exposure operation control circuit for forming a control signal for making the control circuit operative with the release operation and starting the exposure control operation; and
   (f) an aperture stop-down confirmation switch, said switch making the control circuit operative therewith independently of the control signal from the exposure operation control circuit.

6. A camera comprising:
   (a) a diaphragm device, said device including a diaphragm blade member for controlling an aperture and an electromagnetic means for driving the blade member, said blade member being driven by addition of electrical signal to the electromagnetic means, and returning to its initial position by the disappearance of the electrical signal, and said electromagnetic means controlling the driving amount of the blade means in correspondence to the amount of the electrical signal added thereto, whereby the diaphragm aperture is determined in correspondence to the amount of the electrical signal added to the electromagnetic means;
   (b) exposure information signal forming means, said means forming an exposure information signal;
   (c) a control circuit, said circuit applying the electrical signal with a value corresponding to the exposure information signal so as to control the aperture;
   (d) release operation means;
   (e) an exposure operation control circuit for forming a control signal for making the control circuit operative with the release operation and starting the exposure control operation; and
   (f) an aperture stop-down confirmation switch, said switch making the control circuit operative therewith independently of the control signal from the exposure operation control circuit.

7. A camera comprising:
   (a) a diaphragm member, said member having a property for changing the light permeability so as to form a light admitting part and a light shading part and controlling the aperture value with the area of the light admitting part;
   (b) a light measuring circuit for measuring the light incident through the diaphragm member;
   (c) a control circuit, said circuit deciding the area of the light admitting part of the property member in accordance with the output of the light measuring circuit;
   (d) an aperture stop-down confirmation switch; and
   (e) a control signal forming means, said means forming a control signal for making the control circuit operative by means of the operation of the switch.

8. A camera comprising:
   (a) a diaphragm member having a blade member for controlling the diaphragm aperture, and electromagnetic means for driving the blade member and controlling the driving amount thereof, said electromagnetic means controlling the driving amount in correspondence to the electrical signal value;
   (b) a light measuring circuit for measuring the light beam incident through the diaphragm member;
   (c) a control circuit, said circuit applying the electrical signal with a value corresponding to the output of the light measuring circuit to the electromagnetic means so as to control the aperture;
   (d) an aperture stop-down confirmation switch; and
   (e) control signal forming means, said means forming a control signal for making the control circuit operative by means of the operation of the switch.

9. A camera comprising:
   (a) a diaphragm member, said member having a property for changing the light permeability so as to form a light admitting part and a light shading part and controlling the aperture value with the area of the light admitting part;
   (b) a light measuring circuit for measuring the light incident through the diaphragm member;
   (c) an aperture stop-down confirmation switch;
   (d) a control circuit to be made operative by means of the operation of the switch so as to gradually increase the area of the light shading part of the property member; and
   (e) detecting means for detecting the output of the light measuring circuit, said means producing a detection output when the output of the light measuring circuit has reached a certain determined value, so as to stop the increase of the area of the light shading part by means of the control circuit.

10. A camera comprising:
    (a) a diaphragm device, said device including a diaphragm blade member for controlling an aperture and an electromagnetic means for driving the blade member, said blade member being driven by addition of electrical signal to the electromagnetic means, and returning to its initial position by the disappearance of the electrical signal, and said electromagnetic means controlling the driving amount of the blade means in correspondence to the amount of the electrical signal added thereto, whereby the diaphragm aperture is determined in correspondence to the amount of the electrical signal added to the electromagnetic means;
    (b) a light measuring circuit for measuring the light beam incident through the diaphragm member;
    (c) an aperture stop-down confirmation switch;
    (d) a control circuit to be made operative with the operation of the switch so as to gradually change the value of the electrical signal; and
    (e) detecting means for detecting the output of the light measuring circuit, said means producing a detection output when the output of the light measuring circuit has reached a certain determined value, so as to latch the electrical signal.

11. A camera in accordance with claim 9, wherein the control circuit including a counter for counting the pulses by means of the operation of the switch and a signal forming circuit for forming the output signal in accordance with the content of the counter, whereby the area of the light admitting part of the property member is decided in accordance with the output of the signal forming circuit, while the counting operation of the counter is stopped by means of the detection circuit.

12. A camera in accordance with claim 10, wherein the control circuit including a counter for counting the pulses by means of the operation of the switch and a signal forming means for forming the electrical signal with a value corresponding to the content of the counter, while the counting operation of the counter is stopped by means of the detection output.

13. A camera in accordance with claims 1 or 2 or 5 or 6 or 7 or 8 or 9 or 10, wherein the switch being in operative engagement with the release operation member.

14. A camera comprising:
(a) a diaphragm member, said member having a property for changing a light transmittance so as to form a light admitting part and a light shading part for controlling an aperture value;
(b) a control circuit, said circuit deciding the area of the light admitting part of the property matter in accordance with the exposure information signal;
(c) a diaphragm closing confirmation switch; and
(e) control signal forming means, said means forming a control signal for making the control circuit operative by means of the operation of the switch.

* * * * *